United States Patent
Snyder, II

(10) Patent No.: US 9,678,779 B2
(45) Date of Patent: Jun. 13, 2017

(54) METHOD AND AN APPARATUS FOR CO-PROCESSOR DATA PLANE VIRTUALIZATION

(71) Applicant: Cavium, Inc., San Jose, CA (US)

(72) Inventor: Wilson Parkhurst Snyder, II, Holliston, MA (US)

(73) Assignee: Cavium, Inc., San Jose, CA (US)

( * ) Notice: Subject to any disclaimer, the term of this patent is extended or adjusted under 35 U.S.C. 154(b) by 85 days.

(21) Appl. No.: 14/447,732

(22) Filed: Jul. 31, 2014

(65) Prior Publication Data
US 2016/0034288 A1 Feb. 4, 2016

(51) Int. Cl.
G06F 9/44 (2006.01)
H04B 7/212 (2006.01)
G06F 9/455 (2006.01)

(52) U.S. Cl.
CPC .......... *G06F 9/45558* (2013.01); *G06F 2009/45583* (2013.01)

(58) Field of Classification Search
CPC ... H04W 76/022; H04W 88/16; H04W 76/02; G06F 11/1443; G06F 11/1464; H04J 2203/0051; H04J 2203/0058
See application file for complete search history.

(56) References Cited

U.S. PATENT DOCUMENTS

| | | | |
|---|---|---|---|
| 8,054,832 B1* | 11/2011 | Shukla | H04L 45/00 370/230 |
| 9,258,219 B1* | 2/2016 | Safrai | H04L 49/10 |
| 2009/0067835 A1* | 3/2009 | Chen | H04J 3/14 398/45 |
| 2011/0158181 A1* | 6/2011 | Walker | H04W 12/06 370/329 |
| 2011/0305202 A1* | 12/2011 | Wang | H04L 41/048 370/328 |
| 2013/0254767 A1* | 9/2013 | Mizuno | G06F 9/455 718/1 |
| 2015/0043353 A1* | 2/2015 | Javed | H04L 43/12 370/241 |
| 2015/0117408 A1* | 4/2015 | Kedalagudde | H04W 36/0027 370/331 |
| 2016/0014710 A1* | 1/2016 | Szilagyi | H04L 69/28 370/350 |

OTHER PUBLICATIONS

Yi Wang et al.; Virtual Routers on the Move Live Router Migration as a Network-Management Primitive; 2008 ACM; pp. 231-242; <http://dl.acm.org/citation.cfm?id=1402985>.*

(Continued)

*Primary Examiner* — Thuy Dao
*Assistant Examiner* — Cuong V Luu
(74) *Attorney, Agent, or Firm* — pkalousek.ip

(57) ABSTRACT

A method and a system embodying the method for a data plane virtualization, comprising assigning each of at least one data plane a unique identifier; providing a request comprising an identifier of one of the at least one data plane together with an identifier of a virtual resource assigned to a guest; determining validity of the provided request in accordance with the identifier of the one of the at least one data plane and the identifier of the virtual resource assigned to the guest; and processing the request based on the determined validity of the request are disclosed.

22 Claims, 7 Drawing Sheets

(56) References Cited

OTHER PUBLICATIONS

Muhammad Bilal Anwer et al.; Building a Fast Virtualized Data Plane with Programmable Hardware ; 2009 ACM; 8 pages; <http://dl.acm.org/citation.cfm?id=1592650>.*

Teemu Koponen et al.; Network Virtualization in Multi-tenant Datacenters; 2014 USENIX; pp. 202-216; <https://www.usenix.org/system/files/conference/nsdi14/nsdi14-paper-koponen.pdf>.*

Jayaram Mudigonda et al.; NetLord a Scalable Multi-Tenant Network Architecture for Virtualized Datacenters; 2011 ACM; pp. 62-73; <http://dl.acm.org/citation.cfm?id=2018444>.*

Raouf Boutaba; Network Virtualization State of the Art and Research Challenges; 2009 IEEE; pp. 20-26; <http://ieeexplore.ieee.org/stamp/stamp.jsp?arnumber=5183468>.*

Miguel Dias et al. Cloud4NFV A Platform for Virtual Network Functions; 2014 IEEE; pp. 288-293; <http://ieeexplore.ieee.org/stamp/stamp.jsp?arnumber=6969010>.*

\* cited by examiner

METHOD AND AN APPARATUS FOR CO-PROCESSOR DATA PLANE VIRTUALIZATION

BACKGROUND

1. Field

The present disclosure relates to communications in computer networks. More particularly, this invention is directed toward a virtualization of a co-processor data plane.

2. Description of Related Technology

In computer systems, virtualization is a process by which a virtual version of computing resources, such as hardware and software resources, i.e., a central processor unit, a storage system, an input/output resources, a network resource, an operating system, and other resources known in the art, are simulated by a computer system, referred to as a host machine.

FIG. 1 depicts a conceptual structure of a virtualization system 100. A hardware platform 102, comprises all physical entities embodying computing resources required by a specific host machine, i.e., a central processor unit, an input/output resources, a storage system, a network resource, and other resources known to a person having ordinary skill in the art. To avoid undue complexity, only a storage system 104, a network resource 106, a System Memory Management Unit (SMMU) 108, and a Memory Management Unit (MMU) 110 are shown. The storage system 104, may comprise a hard drive, a semiconductor based memory, and other types of memory known in the art. The terms storage system and memory are used interchangeably. The network resource 106 may comprise at least one Network Interface Card (NIC) or other network interface entity known to a person of ordinary skills in the art.

The hardware platform 102, together with an optional software entity 112, i.e., operating system, comprises a host machine operating a Type 2 hypervisor, also known as hosted hypervisor 114. As well known to a person having ordinary skill in the art, the optional software entity 112 is not necessary for Type 1 hypervisor, also known as native hypervisor. A hypervisor is software or firmware entity that creates and operates at least one virtual machine, also referred to as a guest and/or a guest machine. As depicted in FIG. 1, the hosted hypervisor 114 created and operates three virtual machines 116. Through hardware virtualization, the hosted hypervisor 114 provides each virtual machine 116 with a virtual hardware operating platform. By interfacing with the virtual hardware operating platform, the virtual machines 116 access the computing resources of the host machine to execute the virtual machines' respective operations. As a result, a single host machine can support multiple virtual machines 116, each operating an operating system (not shown) and/or other software entity, i.e., an application (not shown), simultaneously through virtualization.

To enable transfer of data into and from the virtualization system 100, via network resource 106, as well as among different entities of the virtualization system 100, the hosted hypervisor 114, the virtual machines 116, and the optional software entity 112, instantiate a data plane entity 118. A data plane entity comprises a firmware or a software entity executed on the hardware platform 102 underlying the guests, i.e., the hosted hypervisor 114 and the virtual machines 116. Additionally, the data plane may be executed by a user process within a virtual machine 116, on which the user process executes.

In a typical host machine, the virtual hardware operating platform should be presented to the virtual machines in a manner that assures that the virtual nature of the hardware platform should not be discernible to the virtual machines. Consequently, the host machine should avoid conflicts between virtual machines in accessing the computing resources. To accomplish these goals, the host machine may implement a translation scheme between the virtual machines' software and the host machine's resources. One of such translation schemes is accomplished via uses of the SMMU 108 and/or the MMU 110, as explained in greater detail in reference to FIG. 2.

Consider FIG. 2, depicting an example of a conceptual architecture of a virtualized system 200. The architecture comprises a plurality of co-processors, assisting the processor cores 228 with functions comprising, e.g., packet input 220, packet output 222, memory allocation 224, work scheduling, 226, and other functions known to a person of ordinary skills in the art. A co-processor comprises a processing unit used to supplement the functions of the central processing unit. Supplemental functions, performed by the co-processor, may comprise floating point arithmetic, graphics, signal processing, string processing, encryption, input/output interfacing with peripheral devices, and other functions known to a person of ordinary skills in the art. The co-processor carries out these functions under a close control of a supervisory processing unit, e.g., the central processing unit. A processor core is a processing unit at the central processing unit, which reads and executes program instructions.

Data in form of a packet 230 arrives at the network interface 206, and is parsed by a packet input 220. The packet input 220 determines a guest-pool identifier 232, in accordance with one of the fields comprising the parsed packed, e.g., an inbound MAC address, a quality-of-service information, and/or other fields known to a person or ordinary skills in the art. Although the packet input 220, comprising a hardware, or hardware and software entity, is depicted as a part of the network interface 206, in another aspect the packet input 220 may be implemented as separate entity. Guest-pool is a virtual resource assigned to a guest. A virtual pool comprises a number of blocks in a virtual memory assigned to the guest.

Each guest-pool is associated with a quality of service that a packet stored in the guest-pool should receive. Quality of service is the overall performance of the network communication, including the transfer of data within the virtualized system, as seen by the users, and is quantified by measuring different parameters, e.g., error rates, bandwidth, throughput, transmission delay, availability, jitter, and other parameters known to persons of ordinary skills in the art.

The packet input 220 then requests a memory allocator 224 to allocate a space in the memory 204 to which to write the parsed packet. In an aspect implementing a quality of service, the request comprises the guest-pool identifier 232, which indicate a guest-pool (not shown) for the parsed packet, so that a required quality of service for the parsed packet may be achieved. The memory allocator 224 translates the guest-pool identifier 232 into a corresponding local-pool identifier (not shown), indicating the local-pool 234 in the memory 204, and allocates the requested space in the local-pool 234. A local-pool comprises a number of blocks, i.e., portion of the (physical) memory 204. The packet input 220 writes the parsed packet to the requested space in the local-pool 234 by translating a virtual address of a space in the guest-pool via a System Memory Management Unit (SMMU) 208.

The SMMU 208 comprises a hardware or a hardware and software entity interacting with the co-processors (220, 222, 224, 226) and the memory 204, to guarantee that the memory 204 is properly virtualized, i.e., that a specific virtual address can only access resources in the memory 204, to which the owner of the virtual address has been granted access. Such a guarantee may be accomplished by utilizing, e.g., a stream identifier, and/or transaction identifier, and/or context identifier, or any other mechanisms known to a person of ordinary skill in the art. The term stream indicates a specific flow of information between a virtual entity requesting a memory transaction, i.e., writing to or reading from the physical memory, and determines the address space in the physical memory to which the corresponding virtual memory transaction belongs.

The SMMU 208 then uses the identifier together with the virtual address in the guest-pool provided by the packet input 220 to compute a physical address in a corresponding local-pool 234 in the memory 204 and writes the parsed packet to the local-pool 234.

The packet input 220 then informs a scheduler 226 that work 236 is needed to be carried out. Work is a general concept of something to be processed. Work properties are specific to an implementation of a scheduler. By means of an example, such work properties may comprise a work queue entry, comprising a pointer to the work to be processed. By means of an example, in the case of an interrupt work, the pointer indicates a data structure used to process the interrupt. Another property may comprise a work quality of service, i.e., identifier(s) which portion of the scheduler will handle the work, processor cores that may handle the work, priority related to that work, and other quality of service related identifier(s) known to person of ordinary skills in the art. Yet another property may indicate whether the work can be carried out in parallel manner, or whether the work must be carried out in serial manner. A person of ordinary skills in the art will understand that other and/or additional work properties are contemplated.

The scheduler 226 schedules the work 236 for a processor core, e.g., a processor core 228_1 at a virtual machine 216_1 that is assigned to carry out the work 236 on the parsed packet. In one aspect, the scheduler 226 may need to maintain data structures organizing work in the memory 204, and therefore allocate or return pointers to the memory 204 from the memory allocator 224 and/or access the memory 204.

The processor core 228_1 requests the parsed packet via a MMU 210. The MMU 210 comprises a hardware, or a hardware and software entity that guarantees that a software executing on any of the processor cores 228 can only access resources of any of the co-processors (220, 222, 224, 226) and the memory 204 to which the processor core 228 was granted access, by a supervising entity, e.g., the hypervisor 214.

The mechanism used by the MMU 210 to supervise access to resources for the processor cores 228, may comprise the mechanism used by the SMMU 208 to supervise access to resources for the co-processors (220, 222, 224, 226).

However, not to hinder performance, certain communicative connections, e.g., among the co-processors: packet input 220, packet output 222, and scheduler 226, as well as between the co-processors: packet input 220, packet output 222, scheduler 226, and the memory allocator 224, in the architecture of a virtualized system 200 are not protected by either the MMU 210 nor the SMMU 208. Consequently, a rouge or errant guest software could gain access to functions, e.g., request work from a scheduler 226, or access region in a memory 204 via a memory allocator 224, to which that guest software is not authorized. Although the guest software, which runs on processor core(s) 228, is communicating via MMU 210 via communicative coupling 229, the MMU 210 safeguards only an address. Thus, when the guest software issues an address of a co-processor, e.g., the scheduler 226, with which the guest software is authorized to communicate, the MMU 210 allows the communication, and the guest software may then instruct the scheduler 226 to access memory allocator 224, to which the guest software is not authorized. Consequently, current architectures are not able to avoid all conflicts between virtual machines in accessing the computing resources.

Additionally, the unprotected communicative connections mean that guests do not have a private numbering space when communicating virtual resource assigned to the guest. Ideally each guest should be under the illusion that the virtual resource assigned to the guest is unique. By means of an example the guest should be under the illusion that a guest-pool with identifier 0, assigned to the guest is unique and isolated from a guest-pool with identifier 0, assigned to another guest, even though in the hardware memory 204, there is only a single local-pool with identifier 0 and not a local-pool with identifier 0 for each guest.

Accordingly, there is a need in the art for a co-processor data plane virtualization, providing a solution to at least the above identified problems.

SUMMARY

In an aspect of the disclosure, an apparatus and a method for a data plane virtualization according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
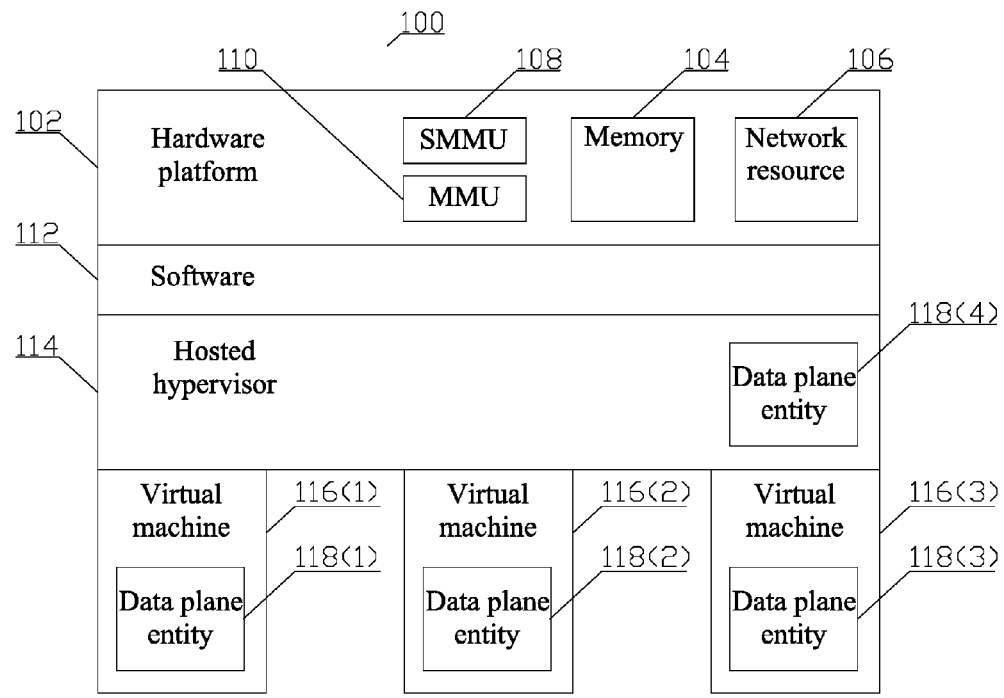
FIG. 1 depicts a conceptual structure of a virtualization system in accordance with known concepts.
Figure 2:
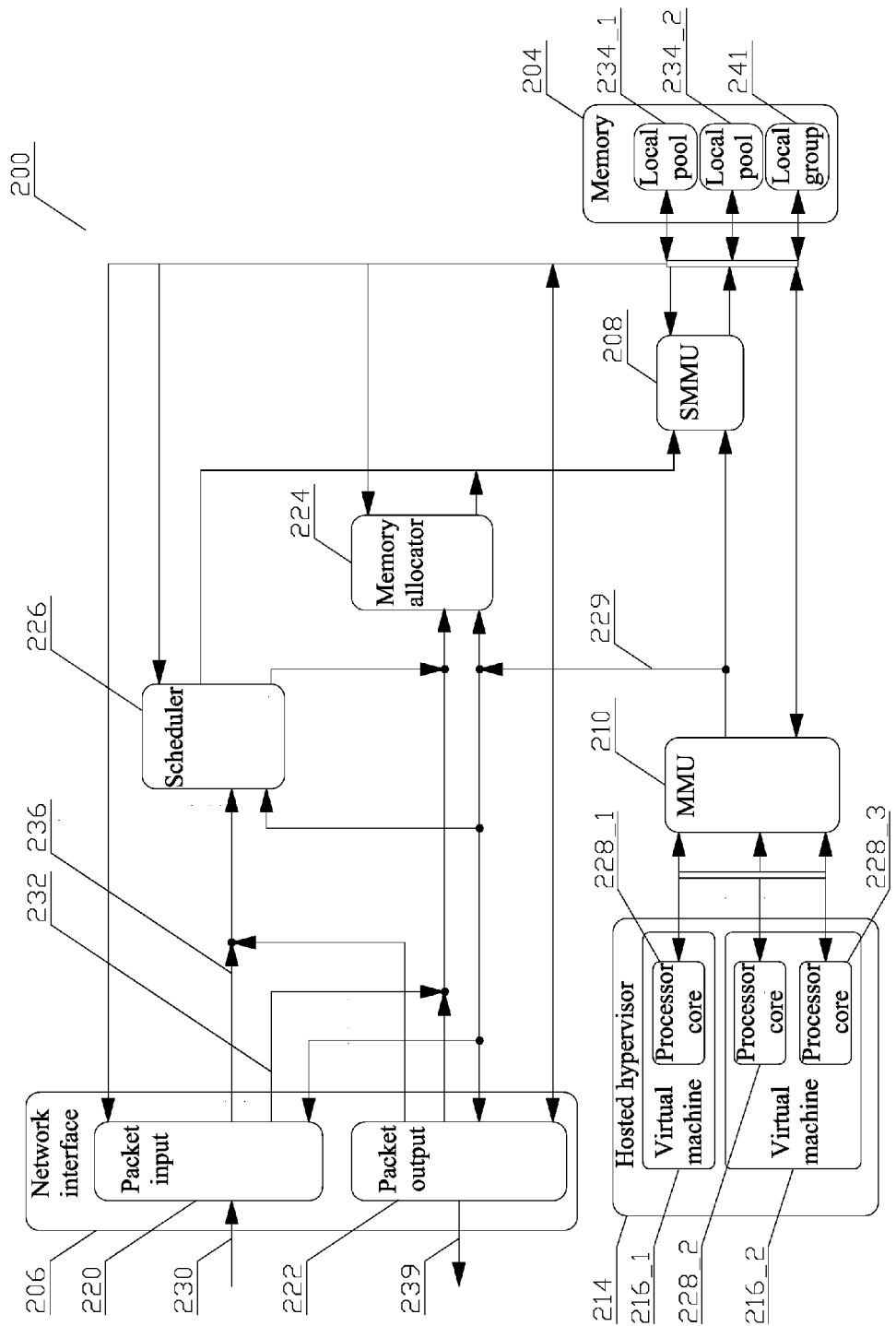
FIG. 2 depicts a conceptual architecture of a virtualized system in accordance with known concepts.

The description of like structural elements among the figures, is not repeated, the like elements have reference numerals differing by an integer multiple of 100, i.e., reference numeral 102 in FIG. 1, becomes reference numeral 202 in FIG. 2; unless differences and/or alternative aspects are explicitly noted. Any unreferenced arrow or a double-arrow lines indicate a possible information path between the depicted communicatively coupled entities; wherein the arrow indicates a predominant direction of the information flow. The predominant direction may elicit a reply, e.g., acknowledgement in the opposite direction. A double-line indicates a bus, i.e., a communication system that transfers data between devices attached to the bus. The term communicatively coupled is understood to refer to a direct path over which information may flow, e.g., between the packet input 220 and the scheduler 226, as well as indirect path via an intervening entity, e.g., between the packet input 220 and the memory 204 via the scheduler 226 and the SMMU 208.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," an and the are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

Figure 3:
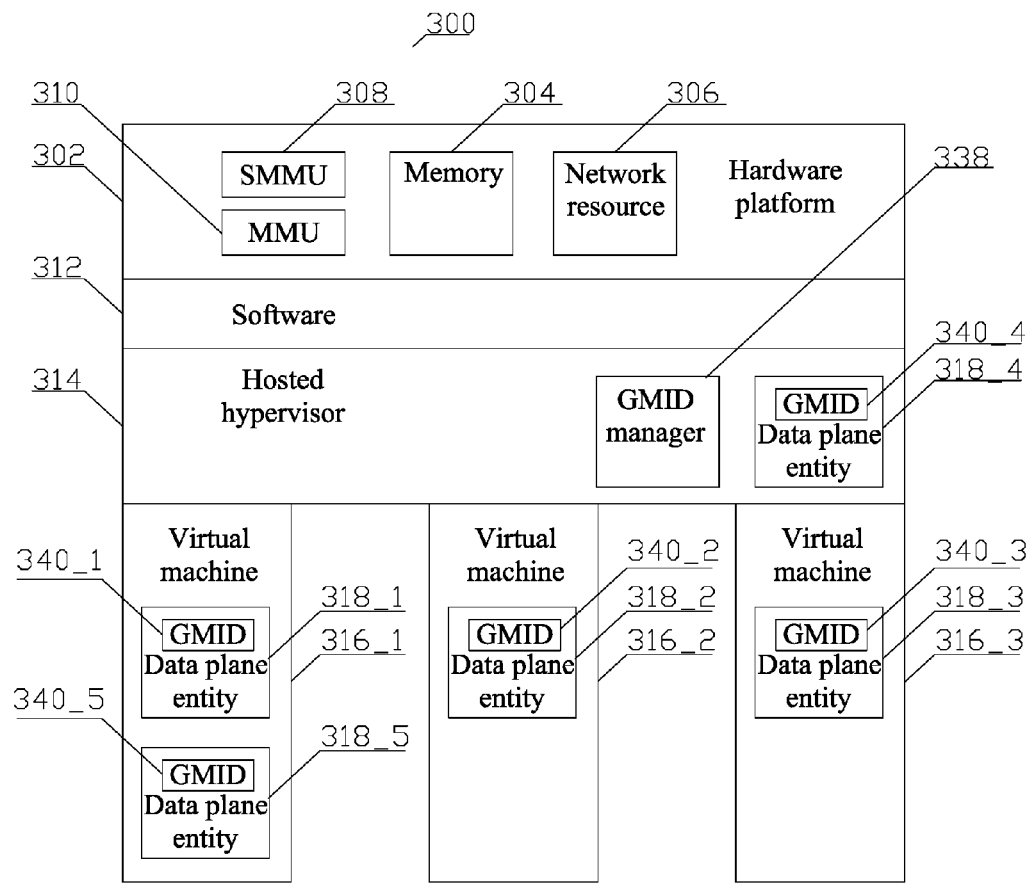
FIG. 3 depicts a depicts a conceptual structure of a virtualization system for co-processor data plane virtualization in accordance with aspects of this disclosure.

FIG. 3 depicts a conceptual structure of a virtualization system 300 for co-processor data plane virtualization. In addition to the entities enumerated and disclosed in regards to the virtualization system 100 of FIG. 1, the virtualization system 300 comprises a Guest Machine Identifier (GMID) manager 338, comprising a hardware, or a hardware and software entity, which assigns a unique Guest Machine Identifier (GMID) 340 to each of the data plane entities 318; that is, the GMID 340 is different for each data plane entity 318. Consequently, every information exchange involving any data plane entity 318 among the co-processors, as well as between each of the co-processors and any other entity comprising the virtualization system 300, includes a GMID 340. The GMID 340 identifies a data plane 318, which is either a source or a target of data transfer authorized by the GMID manager 338 to access the virtualization systems' 300 resources, as disclosed in greater details infra. Because a data plane entity 318 is associated with a guest entity, the guest entity is likewise identified by the GMID 340. Such guest entities comprise e.g., the hosted hypervisor 314, the virtual machine 316, and a user process within a virtual machine 316, on which the user process executes.

Additionally, each of the guest entities may comprise more than one data plane entity 318. By means of an example, the virtual machine 316(1), comprises two data plane entities 318_1, 318_5.

Although a hosted hypervisor 314 is depicted and described, the disclosed aspects are equally applicable to a native hypervisor. Additionally, although the GMID manager 338 is depicted as being a part of the hosted hypervisor 314, the GMID manager 338 may be part of other entities, e.g., the operating system.

Figure 4:
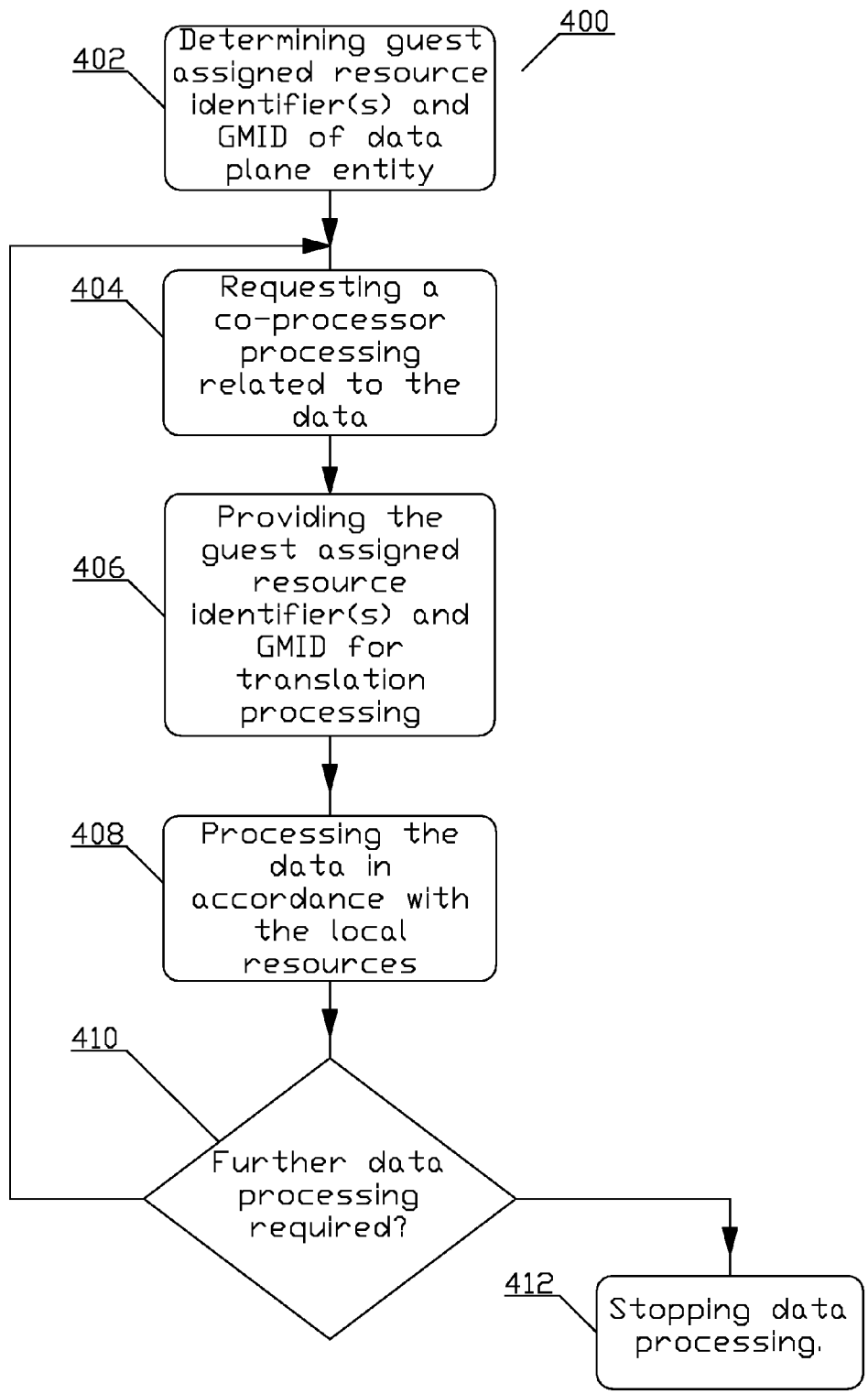
FIG. 4 depicts a flow chart enabling processing of data in form of a packet arriving at a network interface of the conceptual structure of the virtualization system for co-processor data plane virtualization in accordance with aspects of this disclosure.
Figure 5:
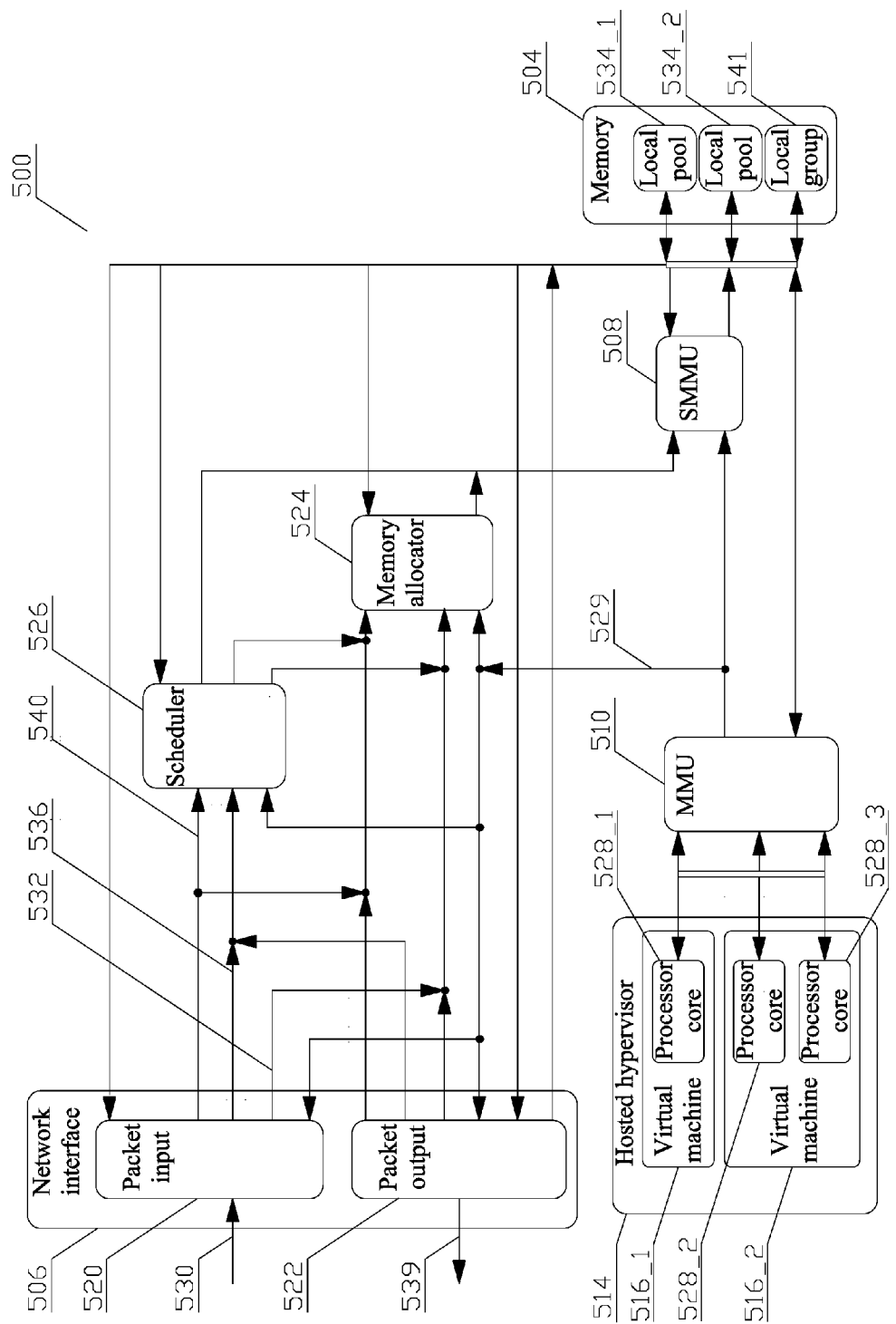
FIG. 5 depicts a conceptual architecture of a virtualized system for co-processor data plane virtualization in accordance with aspects of this disclosure.

FIG. 4 depicts a flow chart enabling processing of data in form of a packet arriving at a network interface of the conceptual structure of a virtualization system 300 for co-processor data plane virtualization, disclosed in FIG. 3 and associated text. Reference is further made to FIG. 5, depicting a conceptual architecture 500 of the virtualized system 300. Reference numerals of structural elements of FIG. 3 and FIG. 5 are in parenthesis. As disclosed in FIG. 3 and associated text, the GMID manager 338 assigns to each data plane entity 318 a unique GMID 340.

In step 402, identifier(s) of resources assigned to a guest that is to receive the data and a GMID of a data plane entity associated with the guest are determined by an entity of the virtualization system requesting a data transaction, e.g., a co-processor, a hypervisor, a virtual machine, or other entity known to a person of ordinary skills in the art. The manner of the determination depends on the entity requesting the data transaction, and a specific implementation of such entity. Two examples of possible implementations of determination are given below.

By means of an example, the requesting entity may comprise a packet input (520). The packet input (520) parses a packet (530) arriving at a network interface (506), and determines a GMID (540) of a data plane entity, which is to receive the packet (530), in accordance with one of the fields of the parsed packed, e.g., an inbound MAC address, a quality-of-service information, and other fields known to a person of ordinary skills in the art. The field of the parsed packed to be taken into an account for the determination is selected by configuration information provisioned by software, e.g., the hypervisor (514). Since a data plane entity is associated with a specific guest, the identity of the guest assigned to process the packet is also known. Additionally, the packet input (520) determines the identifier of resources assigned to the guest, i.e., a guest-pool identifier (532) of a guest-pool (not shown).

By means of another example, the requesting entity may comprise a packet output (522), which transmits a packet (539) from the network interface (506) to a network. A packet to be transmitted is provided by a guest entity, e.g., the hosted hypervisor (514), the virtual machines (516), to a descriptor queue (not shown). At least one descriptor queue is associated with a data plane of the guest entity; consequently, the at least one descriptor queue is associated with a GMID (540). The packet output (522), scans the descriptor queues, and upon detecting a change, determines the GMID (540) of the data plane associated with the guest entity, which provided the packet. Although the packet output (522), comprising a hardware, or hardware and software entity, is depicted as a part of the network interface (506), in another aspect the packet output (522) may be implemented as separate entity.

The process continues in step 404.

In step 404, a co-processor is requested to carry out processing related to the data. Continuing with the example of incoming packet processing, the packet input (520) requests a memory allocator (524) to allocate a space in the memory (504), to which to write the parsed packet. In one aspect, the request comprises a separate GMID (540) and a separate guest-pool identifier (532), as illustrated in FIG. 5. In another aspect, the GMID (540) may be an implicit part of the request. By means of an example, the GMID (540) may comprise a part of a physical address of the processor core(s) (528), communicating via MMU (510) to be provided to a co-processor when requesting processing by that co-processor. The process continues in step 406.

In step 406, the co-processor provides the GMID (540) and the guest-pool identifier (532) for translation processing. The processing carried out by the co-processor is disclosed in detail in FIG. 6 and associated text, infra.

For the purposes of brevity of the example, it is assumed that the request is valid, i.e., the combination of the GMID and the identifier of the virtual resource assigned to the guest has an entry in a translation structure. Additionally, a request is considered valid when the option of GMID comprises a reserved value is implemented. A person of ordinary skills in the art will understand the alternatives processing as disclosed in reference with FIG. 6 and associated text, infra, i.e., processing of the optional processing of reserved GMID or processing of an invalid request, i.e., the combination of the GMID and the identifier of the virtual resource assigned to the guest has no entry in a translation structure.

Continuing with the example of incoming packet processing, in response to the request from the packet input (520), the memory allocator (524) determines validity of the request, and when the request is found valid, provides the GMID (540) and the guest-pool identifier (532) into a local-pool identifier (not shown) for translation, allocates requested space in the local-pool (534), generates an identifier of the requested space, e.g., a stream identifier (not shown), and provides the stream identifier and a virtual address of the guest-pool to the SMMU (508). The process continues in step 408.

In step 408, the data is processed in accordance with the local resources. Continuing with the example of incoming packet processing, the SMMU (508) computes a physical address in the memory (504) in accordance with the stream identifier, and the virtual address of the guest-pool, and the packet input (520) writes the parsed packet to the provided physical address in the memory (504). The process continues in step 410.

In step 410, a determination is made whether a further processing of the data by a co-processor is required. If the determination is negative, the processing continues in step 412, where the processing stops; otherwise the processing continues in step 404.

By means of an example, after the packet input (520) has written the parsed packet to the provided physical address in the memory (504), the packet input (520) may send a request to the scheduler (526) co-processor, requesting work (536) to be carried out on the parsed packet, i.e., a step 404. To improve scheduling efficiency, each processor core (528) may be associated with a (scheduler) group, which comprises one or more queues. Consequently, when a software entity executing on the processor core (528) or the processor core (528) itself requests work, an arbitration deciding which work is to be provided does not need to be made for the groups not associated with the processor core (528), improving performance. Further details are disclosed in a co-pending application Ser. No. 14/170,955, filed on Feb. 3, 2014, by Wilson P. Snyder II, et al., entitled A METHOD AND AN APPARATUS FOR WORK PACKET QUEUING, SCHEDULING, AND ORDERING WITH CONFLICT QUEUING, and a co-pending application Ser. No. 14/171,108, filed on Feb. 3, 2014, by Wilson P. Snyder II, et al., entitled A METHOD AND AN APPARATUS FOR WORK REQUEST ARBITRATION IN A NETWORK PROCESSOR.

Consequently, in one aspect, the work (536) may comprise a pointer to the address to which the packet to be processed was written, together with an identifier of a group and a queue this work should be enqueued to, and also in one aspect indicating quality of service information. The process continues in step 406.

In step 406, in response to the request comprising the GMID (540) and an identifier of a guest-group (not shown), contained in the work (536) provided by the packet input (520), the scheduler (526) determines validity of the request, and when the request is found valid, provides the GMID (540) and the guest-group identifier into a local-group identifier (not shown) for translation, allocates the requested space in the local-group (541), generates an identifier for the specific information flow, e.g., a stream identifier (not shown), and provides the stream identifier and a virtual address of the guest-group to the SMMU (508). The scheduler (526) then schedules work (536) for a processor core (528), e.g., a processor core (528_1) at a virtual machine (516_1) associated with the guest-group. The processing carried out by the scheduler (526) is disclosed in detail in FIG. 6 and associated text, infra. For the purposes of brevity of the example, it is assumed that the request is valid, a person of ordinary skills in the art will understand the alternatives, i.e., processing of the optional processing of reserved GMID or the processing of an invalid request, from the referred to FIG. 6 and associated text, infra. The process continues in step 408.

In step 408, the data is processed in accordance with the local resources. The SMMU (508) computes a physical address in the memory (504) in accordance with the stream identifier and the virtual address of the guest-group, and the scheduler (526) writes the parsed packet to the provided physical address in the memory (504). The process continues in step 410.

In step 410, it is determined that no further processing of the data by any co-processor is required and the process stops in step 412.

Figure 6:
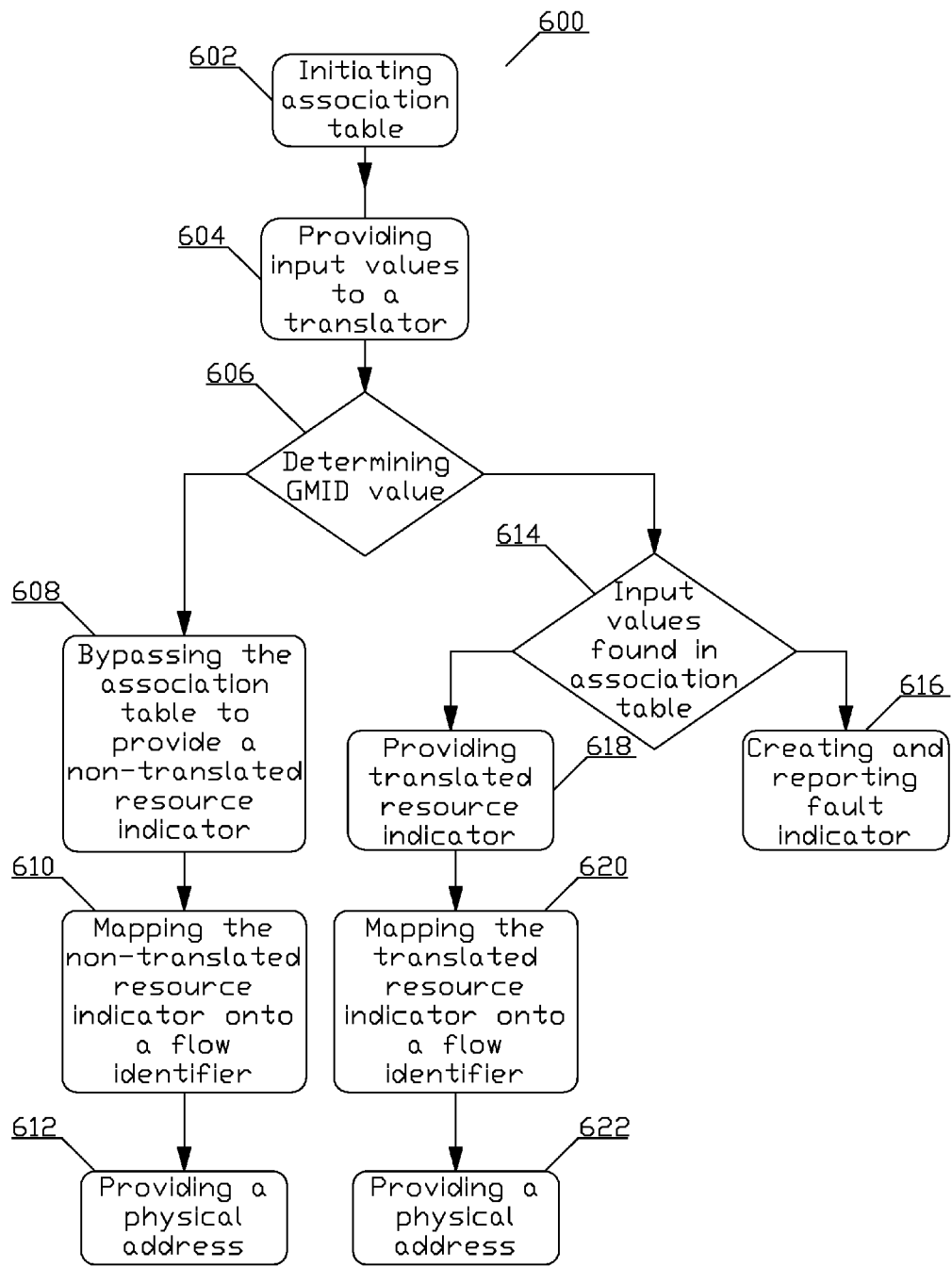
FIG. 6 depicts a flow chart enabling translation of a guest assigned resource to a hardware resource using a GMID.
Figure 7:
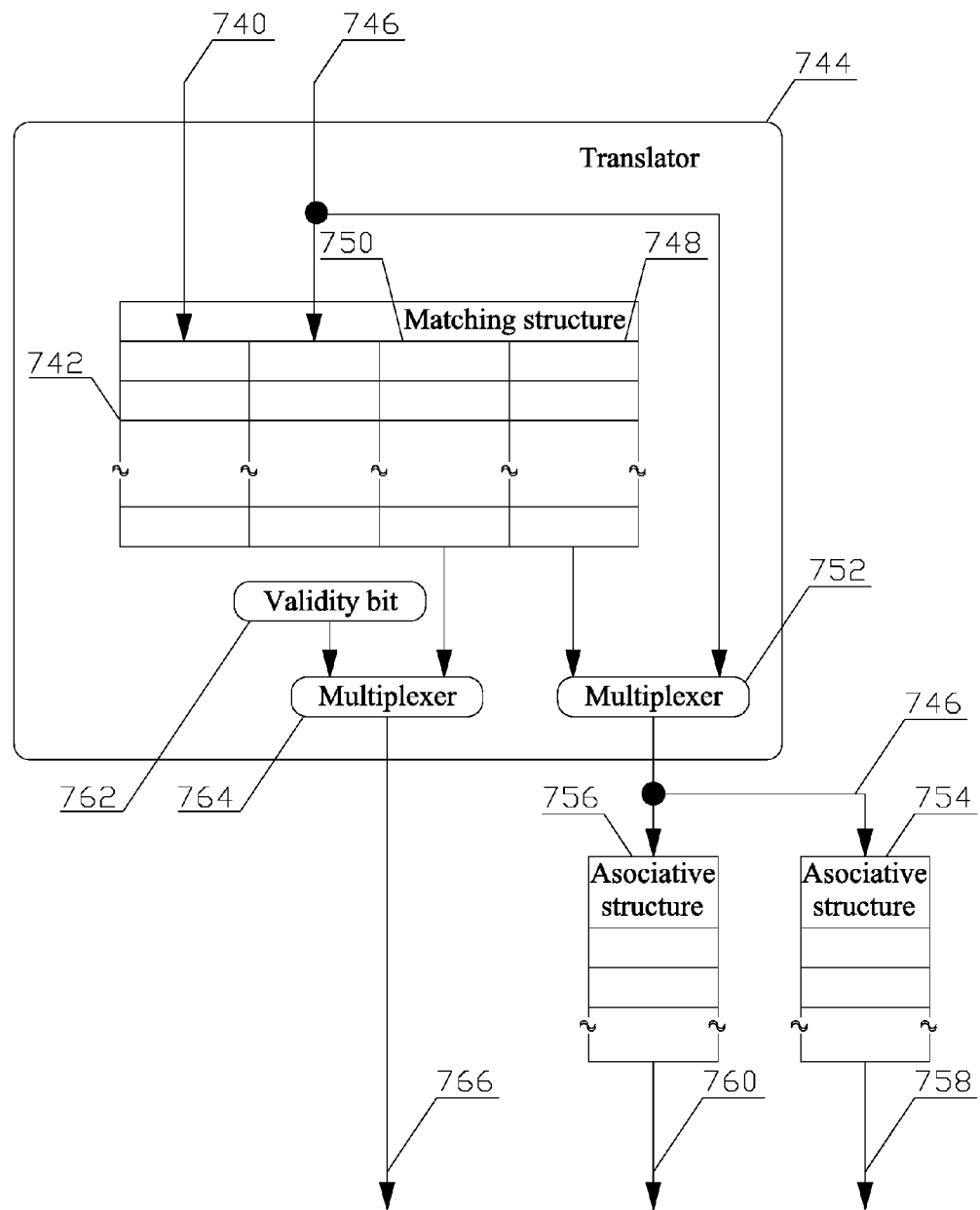
FIG. 7 depicting a conceptual structure enabling translation of a guest assigned resource to a hardware resource using the GMID.

As noted supra, FIG. 6 depicts a flow chart enabling translation of a guest assigned resource to a hardware, i.e., local, resource using a GMID. Reference is further made to FIG. 3 discussed supra, and FIG. 7 infra, depicting a conceptual structure enabling translation of the guest assigned resource to the hardware resource using the GMID. Reference numerals of structural elements of FIG. 7 are in parenthesis.

The process starts in step 602, wherein an entity of the virtualization system (300), e.g., the hypervisor (314), the GMID manager (338), or other entity known to a person of ordinary skills in the art, initiates a structure (742) in a translator (744). The structure (742) associates the GMID (740), an identifier of the guest assigned resource (746), e.g., a guest-pool, a guest-group, or other entity known to a person of ordinary skills in the art, with an identifier of a corresponding hardware resource (748), e.g., local-pool, local-group, or other entity known to a person of ordinary skills in the art. In addition, a validity bit (750) indicates, whether a row in the structure (742) has been initiated with values or not. The structure (742) may comprise a table, a content addressable memory, or any other structure known to a person of ordinary skills in the art enabling such an association. The process continues in step 604.

In step 604, the co-processor initiating the translation process, e.g., the packet input (320), provides input values, i.e., the GMID (740) and the identifier of the guest assigned resource (746), to the translator (744). The process continues in step 606.

In step 606, the translator (744) determines a value of the GMID (740). In one aspect, certain value(s) of GMID (e.g., a logical zero) is(are) reserved so that an entity in the virtualization system (300), e.g., the hypervisor (314), the GMID manager (338), or other entity known to a person of ordinary skills in the art, can masquerade transactions on behalf of a guest. Such transactions' masquerading allows the entity to perform a function on behalf of the guest, for which that guest may not have information or resources to perform itself. Such function may comprise, e.g., cleanup resources that partially contain resources of the entity. When a reserved value is detected the process continues in step 608; otherwise the process continues in step 614.

In step 608, the structure (742) is bypassed, thus the guest assigned resource (746) is not translated and is provided via a multiplexer (752) as an index to a structures (754) and (756). The structure (754) associates the guest assigned resource (746) with an identifier for a specific information flow, e.g., a stream identifier, and/or transaction identifier and/or context identifier, or any other identifier known to a person of ordinary skill in the art (758) for an SMMU (308). The structure (754) may comprise a table, a content addressable memory, or any other structure known to a person of ordinary skills in the art enabling such an association. Additionally, such an association may comprise a method, e.g., an algorithm taking the guest assigned resource (746) as an input and providing the identifier for a specific information flow as an output. The structure (756) associates the guest assigned resource (746) with a virtual address of the guest (760). The structure (756) may comprise a table, a content addressable memory, or any other structure known to a person of ordinary skills in the art enabling such an association. Additionally, such an association may comprise a method, e.g., an algorithm taking the guest assigned resource (746) as an input and providing the virtual address of the guest as an output. The GMID (740) is discarded. The value of validity bit (762), which is preset to valid, is provided via a multiplexer (764) as valid/invalid indicator (766). The process continues in step 610.

In step 610, the flow identifier (758) for SMMU (308) is determined. By means of an example, determination of a stream identifier is described. The structure (754) associates the provided non-translated identifier of the guest assigned resource (746) onto the stream identifier (758). The stream identifier (758) together with the virtual address of the guest (760) provided by the structure (756) are presented to the SMMU (308). The process continues in step 612.

In step 612, the SMMU (308) then outputs a physical address in the memory (304) in accordance with the stream identifier (758) and the virtual address of the guest (760) according to concepts known to a person of ordinary skills in the art.

In step 614, resulting from no reserved value of the GMID (740) being detected in step 606, the input values, i.e., the GMID (740) and the identifier of the guest assigned resource (746), are provided to the structure (742) to determine whether any row matches the GMID (740) and the identifier of the guest assigned resource (746). When a matching row is not found, an invalid value of the validity bit (750) is provided via the multiplexer (764) as the valid/invalid indicator (766), no identifier of a corresponding resource (746) is provided, and the process continues in step 616. Otherwise, when a matching row is not found, the process continues in step 618.

In step 616, the value of valid/invalid indicator (766) is reported to the hypervisor 310, the GMID manager 338, or other entity know to a person of ordinary skills in the art. If the value of valid/invalid indicator (766) indicates a fault condition, the entity may elect from several actions, i.e., drop the packet, increment a hypervisor drop statistic, increment a guest drop statistic, cause a hypervisor interrupt, cause an interrupt at the software entity for which the packet is intended, create an event indicating the error, or any permutation of the above.

In step 618, the valid value of the validity bit (750) is provided to the multiplexer (764) which outputs value of valid/invalid indicator (766) indicating the translation to be valid. Consequently, the identifier of a corresponding resource (746) is provided an index to the structure (754). The process continues in step 620.

In step 620, the structure (754) associates the provided translated identifier of the guest assigned resource (746) onto a stream identifier (758). The stream identifier (758) together with virtual address of the guest (760) provided by the structure (756) are presented to the SMMU (308). The process continues in step 622.

In step 622, the SMMU (308) outputs a physical address in the memory (304) in accordance with the stream identifier (756) together and the virtual address of the guest (760) according to concepts known to a person of ordinary skills in the art.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for a data plane virtualization, comprising:
assigning each of at least one data plane a unique identifier by an identifier manager;
providing a request comprising the unique identifier of one of the at least one data plane together with an identifier of a virtual resource assigned to a guest;
determining validity of the provided request in accordance with the unique identifier of the one of the at least one data plane and the identifier of the virtual resource assigned to the guest; and
processing the provided request based on the determined validity of the provided request.

2. The method as claimed in claim 1, wherein the providing a request comprising the unique identifier of one of the at least one data plane together with an identifier of a virtual resource assigned to a guest, comprises:
providing a request comprising the unique identifier of one of the at least one data plane together with an identifier of a guest-pool.

3. The method as claimed in claim 1, wherein the providing a request comprising the unique of one of the at least one data plane together with a virtual resource assigned to a guest, comprises:
providing a request comprising the unique identifier of one of the at least one data plane together with an identifier of a guest-group.

4. The method as claimed in claim 1, wherein the determining validity of the provided request in accordance with the unique identifier of the one of the at least one data plane and the identifier of the virtual resource assigned to the guest comprises:
determining whether the unique identifier of the one of the at least one data plane comprises a reserved value.

5. The method as claimed in claim 1, wherein the processing the request based on the determined validity of the request comprises:
setting a local resource identifier equal to the identifier of the virtual resource assigned to the guest, when the unique identifier of the one of the at least one data plane comprises a reserved value.

6. The method as claimed in claim 5, further comprising:
providing the local resource identifier to a stream identifier generating structure; and
generating a stream identifier in accordance with the local resource identifier.

7. The method as claimed in claim 1, wherein the determining validity of the received request in accordance with the unique identifier of the one of the at least one data plane and the identifier of the virtual resource assigned to the guest comprises:
determining whether a combination of the unique identifier of the one of the at least one data plane and the identifier of the virtual resource assigned to the guest has an entry in a translation structure.

8. The method as claimed in claim 1, wherein the processing the request based on the determined validity of the request comprises:
translating a combination of the unique identifier of the one of the at least one data plane and the identifier of the virtual resource assigned to the guest to a local resource identifier when the combination of the unique identifier of the one of the at least one data plane and the identifier of the virtual resource assigned to the guest has an entry in a translation structure.

9. The method as claimed in claim 8, further comprising:
providing the local resource identifier to a stream identifier generating structure; and
generating a stream identifier in accordance with the local resource identifier.

10. The method as claimed in claim 1, wherein the processing the request based on the determined validity of the request comprises:
aborting translation of a combination of the unique identifier of the one of the at least one data plane and the virtual resource assigned to the guest to a local resource when the combination of the unique identifier of the one of the at least one data plane and the identifier of the virtual resource assigned to the guest has no entry in a translation structure.

11. The method as claimed in claim 1, further comprising:
parsing an incoming data packet; and
determining the unique identifier of one of the at least one data plane in accordance with a field of the parsed packet.

12. An apparatus for a data plane virtualization, comprising:
at least one guest configured to instantiate at least one data plane;
an identifier manager communicatively coupled with the at least one guest, the identifier manager being configured to assign to each of the at least one data plane a unique identifier;
a first co-processor communicatively coupled with the at least one guest, the first co-processor being configured to provide a request comprising the unique identifier of one of the at least one data plane together with an identifier of a virtual resource assigned to the at least one guest to a second co-processor; and
the second co-processor, configured
to determine validity of the provided request in accordance with the unique identifier of the one of the at least one data plane and the identifier of the virtual resource assigned to the at least one guest; and
to process the provided request based on the determined validity of the provided request.

13. The apparatus as claimed in claim 12, wherein the request comprises:
the unique identifier of one of the at least one data plane together with an identifier of a guest-pool.

14. The apparatus as claimed in claim 12, wherein the request comprises:
the unique identifier of one of the at least one data plane together with an identifier of a guest-group.

15. The apparatus as claimed in claim 12, wherein the second co-processor is configured to determine validity of the request in accordance with the unique identifier of the one of the at least one data plane and the identifier of the virtual resource assigned to the at least one guest by being configured to:
determine whether the unique identifier of the one of the at least one data plane comprises a reserved value.

16. The apparatus as claimed in claim 12, wherein the second co-processor is configured to process the request based on the determined validity of the request by being configured to:

seta local resource identifier equal to the identifier of the virtual resource assigned to the at least one guest, when the unique identifier of the one of the at least one data plane comprises a reserved value.

17. The apparatus as claimed in claim 16, wherein the second co-processor is further configured:
   to provide the local resource identifier to a stream identifier generating structure; and
   wherein the stream identifier generating structure generates a stream identifier in accordance with the local resource identifier.

18. The apparatus as claimed in claim 12, wherein the second co-processor is configured to determine validity of the request in accordance with the unique identifier of the one of the at least one data plane and the identifier of the virtual resource assigned to the at least one guest by being configured to:
   determine whether a combination of the unique identifier of the one of the at least one data plane and the identifier of the virtual resource assigned to the at least one guest has an entry in a translation structure.

19. The apparatus as claimed in claim 12, wherein the second co-processor is configured to process the request based on the determined validity of the request by being configured to:
   translate a combination of the unique identifier of the one of the at least one data plane and the identifier of the virtual resource assigned to the at least one guest to a local resource identifier when the combination of the unique identifier of the one of the at least one data plane and the identifier of the virtual resource assigned to the at least one guest has an entry in a translation structure.

20. The apparatus as claimed in claim 19, wherein the second co-processor is further configured:
   to provide the local resource identifier to a stream identifier generating structure; and
   wherein the stream identifier generating structure generates a stream identifier in accordance with the local resource identifier.

21. The apparatus as claimed in claim 12, wherein the second co-processor is configured to process the request based on the determined validity of the request by being configured to:
   abort translation of a combination of the unique identifier of the one of the at least one data plane and the virtual resource assigned to the alt least one guest to a local resource when the combination of the unique identifier of the one of the at least one data plane and the identifier of the virtual resource assigned to the at least one guest has no entry in a translation structure.

22. The apparatus as claimed in claim 12, wherein the first co-processor is further configured to determine the unique identifier of the one of the at least one data plane by being configured to:
   parse an incoming data packet; and
   determine the unique identifier of one of the at least one data plane in accordance with a field of the parsed packet.

* * * * *